United States Patent
A et al.

(10) Patent No.: US 12,224,907 B2
(45) Date of Patent: Feb. 11, 2025

(54) TRANSLATION OF A SOURCE INTENT POLICY MODEL TO A TARGET INTENT POLICY MODEL

(71) Applicant: Juniper Networks, Inc., Sunnyvale, CA (US)

(72) Inventors: Chandrasekhar A, Bengaluru (IN); Jayanthi R, Bangalore (IN); Premchandar N, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/087,574

(22) Filed: Dec. 22, 2022

(65) Prior Publication Data
US 2024/0097983 A1    Mar. 21, 2024

(30) Foreign Application Priority Data
Sep. 16, 2022    (IN) .............................. 202241052945

(51) Int. Cl.
*G06F 15/173*    (2006.01)
*H04L 41/0894*    (2022.01)

(52) U.S. Cl.
CPC ................................ *H04L 41/0894* (2022.05)

(58) Field of Classification Search
CPC . H04L 41/0894; H04L 41/145; H04L 43/045; H04L 41/0873
See application file for complete search history.

(56) References Cited

U.S. PATENT DOCUMENTS

| | | | |
|---|---|---|---|
| 10,417,591 B2 * | 9/2019 | McLachlan | G06Q 10/06315 |
| 10,693,739 B1 * | 6/2020 | Naseri | G06F 16/29 |
| 10,979,230 B1 * | 4/2021 | Tang | H04L 9/3239 |
| 11,809,410 B1 * | 11/2023 | Yu | G06F 16/2379 |
| 2009/0094208 A1 * | 4/2009 | Marvit | G06F 16/313 |
| 2018/0107764 A1 * | 4/2018 | Bowman | G06F 30/00 |

(Continued)

FOREIGN PATENT DOCUMENTS

| | | |
|---|---|---|
| EP | 3700132 A1 | 8/2020 |
| EP | 3716532 A1 | 9/2020 |
| EP | 3989486 A1 | 4/2022 |

OTHER PUBLICATIONS

Extended European Search Report for Application No. EP23159435.9, mailed on Aug. 21, 2023, 9 pages.

*Primary Examiner* — Dustin Nguyen
*Assistant Examiner* — Hao H Nguyen
(74) *Attorney, Agent, or Firm* — Harrity & Harrity, LLP

(57) ABSTRACT

A system identifies a source intent policy model that is associated with a graph having a plurality of source nodes connected by a plurality of source edges, identifies a set of source nodes of the plurality of source nodes, and translates the set of source nodes to generate a set of target nodes. The system identifies a subset of target nodes, of the set of target nodes, that are not included in a target intent policy model that is associated with a graph having a plurality of target nodes connected by a plurality of target edges. The system determines a hierarchical order associated with the subset of target nodes and the plurality of target node, and causes the target intent policy model to be updated to include the subset of target nodes and the plurality of target nodes, such that the graph is ordered according to the hierarchical order.

20 Claims, 10 Drawing Sheets

(56) References Cited

U.S. PATENT DOCUMENTS

| | | | |
|---|---|---|---|
| 2018/0232262 A1* | 8/2018 | Chowdhury | G06F 9/541 |
| 2018/0329998 A1* | 11/2018 | Thomson | H04N 21/42203 |
| 2019/0182119 A1* | 6/2019 | Ratkovic | H04L 43/06 |
| 2019/0303579 A1* | 10/2019 | Reddy | H04L 9/3239 |
| 2019/0327271 A1* | 10/2019 | Saxena | G06F 8/38 |
| 2020/0274772 A1* | 8/2020 | A | H04W 88/12 |
| 2020/0364580 A1* | 11/2020 | Shang | G06N 3/006 |
| 2021/0011890 A1* | 1/2021 | Mdini | G06F 16/212 |
| 2024/0048485 A1* | 2/2024 | Janakiraman | H04L 45/04 |
| 2024/0119092 A1* | 4/2024 | Rosendahl | G06F 8/35 |

* cited by examiner

TRANSLATION OF A SOURCE INTENT POLICY MODEL TO A TARGET INTENT POLICY MODEL

CROSS-REFERENCE TO RELATED APPLICATION

This application claims priority to Indian Patent Application No. 202241052945, entitled "GRAPH MODEL ANALYSIS DRIVEN POLICY CONVERSION," filed on Sep. 16, 2022, the entire content of which is expressly incorporated herein by reference.

BACKGROUND

Network devices typically include mechanisms, such as management interfaces, for locally or remotely configuring the network devices. By interacting with a management interface, an administrator can perform configuration tasks, such as configuring interface cards of a network device, adjusting parameters for supported network protocols of the network device, specifying physical components within the network device, modifying routing information maintained by the network device, accessing software modules and other resources residing on the network device, and/or other configuration tasks.

A network device can be configured by a network management system according to a declarative network operation model, such as an intent-based networking model. The system allows administrators to describe one or more intended states of the network device, such as an intended network state, execution state, storage state, and/or another state. Intents can be categorized as stateful intents or stateless intents. Stateful intents (also referred to as "business policies") may be resolved based on a current state of the network device. Stateless intents may be resolved regardless of the current state of the network state.

SUMMARY

In some implementations, a method includes identifying, by a system, a source intent policy model that is associated with a first graph having a plurality of source nodes connected by a plurality of source edges; identifying, by the system, a set of source nodes of the plurality of source nodes; translating, by the system, the set of source nodes to generate a set of target nodes; identifying, by the system, a subset of target nodes, of the set of target nodes, that are not included in a target intent policy model that is associated with a second graph having a plurality of target nodes connected by a plurality of target edges; determining, by the system, a hierarchical order associated with the subset of target nodes and the plurality of target nodes; and causing, by the system, the target intent policy model to be updated to include the subset of target nodes and the plurality of target nodes, such that the second graph is ordered according to the hierarchical order.

In some implementations, a non-transitory computer-readable medium storing a set of instructions includes one or more instructions that, when executed by one or more processors of a system, cause the system to: identify a source intent policy model that is associated with a first graph having a plurality of source nodes connected by a plurality of source edges; identify a set of source nodes of the plurality of source nodes; translate the set of source nodes to generate a set of target nodes; identify a subset of target nodes, of the set of target nodes, that are not included in a target intent policy model that is associated with a second graph having a plurality of target nodes connected by a plurality of target edges; and cause the target intent policy model to be updated to include the subset of target nodes and the plurality of target nodes.

In some implementations, a system includes one or more memories and one or more processors to: identify a set of source nodes of a plurality of source nodes of a first graph associated with a source intent policy model; translate the set of source nodes to generate a set of target nodes; identify a subset of target nodes, of the set of target nodes, that are not included in a plurality of target nodes of a second graph associated with a target intent policy model; perform one or more processing operations associated with the subset of target nodes and the plurality of target nodes; and cause, based on performing the one or more processing operations, the target intent policy model to be updated.

DETAILED DESCRIPTION

Figure 1A:
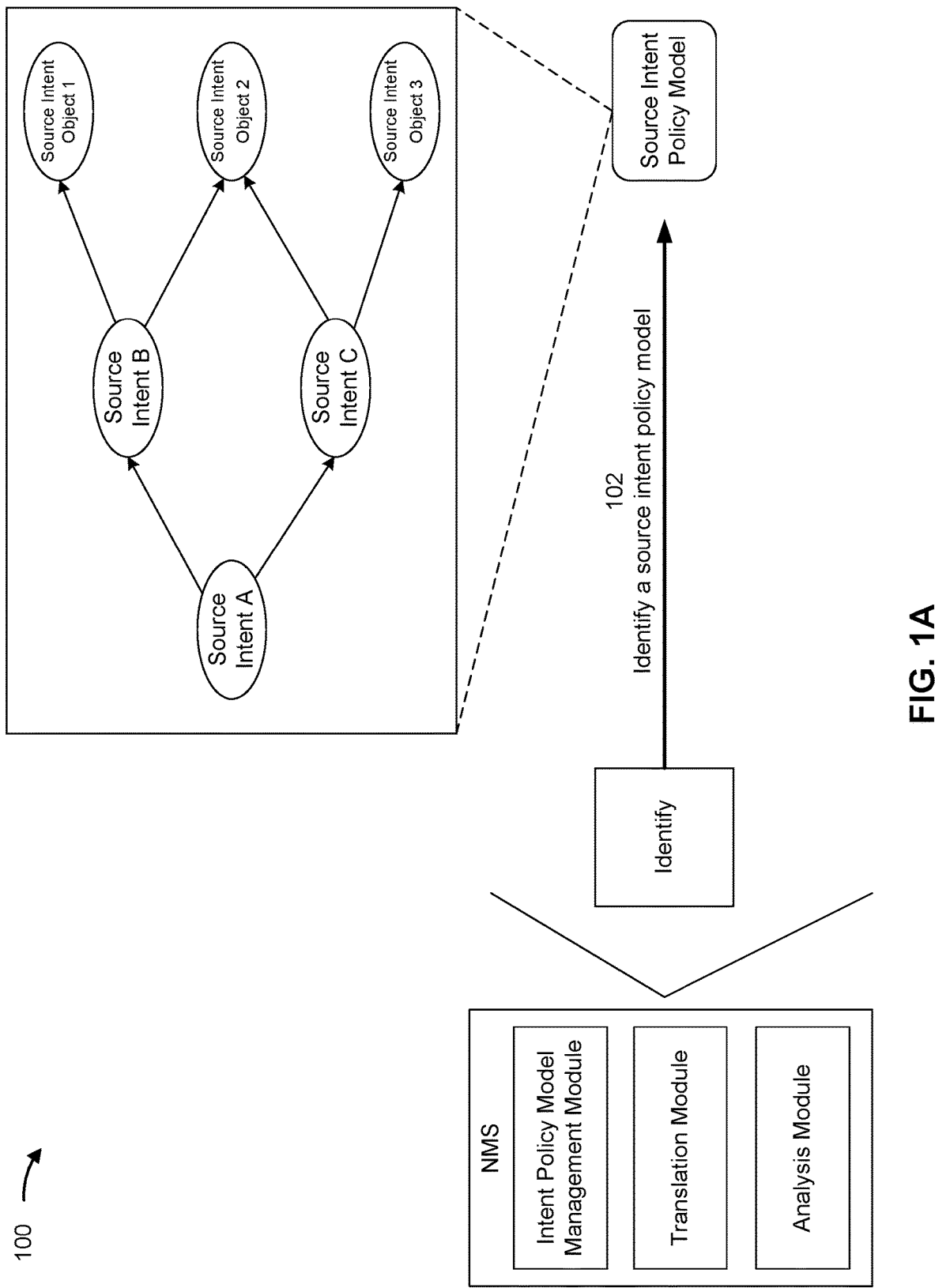
FIGS. 1A-1F are diagrams of one or more example implementations described herein.

The following detailed description of example implementations refers to the accompanying drawings. The same reference numbers in different drawings may identify the same or similar elements.

Intents may be represented in an intent data model, which may be modeled using a unified graph. For example, the intent data model may be represented as a connected graph having nodes (e.g., that represent configuration objects) connected with edges (e.g., that represent relationships between configuration objects). In order to configure a network device to perform the intents, translation programs may translate high-level configuration information (e.g., that includes instructions according to the intent data model, which may be expressed as the connected graph) to low-level configuration information (e.g., that includes instructions according to a device configuration model) for the network device.

A network management system can maintain an intent policy model, such as for cloud services (e.g., secure services edge (SSE) capabilities), that can be deployed to provide services to multiple, different network devices. However, in many cases, each network device also needs to maintain a different intent policy model for on-device services (e.g., firewall or other security services) of the network device. This can result in a network administrator needing to maintain and/or monitor a global intent policy model and individual intent policy models for a network of network devices. Consequently, the network administrator may utilize computing resources (e.g., processing resources, memory resources, communication resources, and/or power resources, among other examples) of a device to manage and monitor the multiple intent policy models.

Some implementations described herein provide a network management system (NMS). The NMS identifies a source intent policy model (e.g., that is associated with cloud services for multiple network devices) and a target intent policy model (e.g., that is associated with on-device services of an individual network device). The source intent policy model is associated with a first graph that has a plurality of source nodes (associated with source intents) connected by a plurality of source edges. The target intent policy model is associated with a second graph that has a plurality of target nodes (associated with target intents) connected by a plurality of target edges.

The NMS identifies a set of source nodes, of the plurality of sources nodes, that are associated with source intents that are to be included in the target intent policy model. The NMS translates the set of source nodes to generate a set of target nodes (e.g., such that the target nodes are formatted to be included in the second graph associated with the target intent policy model). The NMS then identifies a subset of target nodes, of the set of target nodes, that are not included in the second graph. The NMS thereby performs one or more processing operations associated with the set of target nodes and the plurality of target nodes (e.g., that are included in the second graph). For example, the NMS may determine a hierarchical order, identify and resolve conflicts, and/or identify and resolve redundancies associated with the subset of target nodes and the plurality of target nodes. The NMS then may cause the target intent policy model to be updated to include the subset of target nodes and the plurality of target nodes (e.g., such that the second graph is ordered according to the hierarchical order). Further, the NMS may cause the target intent policy model to be updated thereafter based on detecting changes to the source intent policy model.

In this way, the NMS enables multiple intent policy models to automatically be managed and updated (e.g., without manual intervention by a network administrator). Further, the NMS enables automatic conversion of a source intent policy model to a target intent policy model, which allows the network administrator to manage and/or monitor just one intent policy model for a network device, as opposed to two separate intent policy models. Accordingly, computing resources (e.g., processing resources, memory resources, communication resources, and/or power resources, among other examples) of a device are conserved that would otherwise be utilized by the network administrator to manage and monitor multiple intent policy models. Further, ordering issues, conflicts, and/or redundancies that would otherwise be present in association with multiple intent policy models are reduced, which optimizes use of computing resources of the NMS and/or the network device.

FIGS. 1A-1F are diagrams of one or more example implementations 100 described herein. As shown in FIGS. 1A-1F, example implementation(s) 100 may include an NMS and a network device. The NMS and the network device are described in more detail below in connection with FIGS. 2-4. As shown in FIGS. 1A-1F, the NMS may include an intent policy model management module, a translation module, and an analysis module.

As shown in FIG. 1A, and by reference number 102, the NMS (e.g., using the intent policy model management module) may identify a source intent policy model (e.g., an intent policy model, such as for cloud services, that is to be translated to another intent policy model, described herein). The source intent policy model may be a graph-based policy model, such as where source intents and source objects are represented as nodes, and relationships between source intents and source objects are represented as edges, or another type of intent-based model. For example, as shown in FIG. 1A, the source intent policy model may be associated with a graph having a plurality of source nodes connected by a plurality of source edges. The plurality of source nodes may include one or more source intent nodes (e.g., where each source intent node is associated with a source intent) and/or one or more source intent object nodes (e.g., where each source intent object node is associated with a source intent object). The plurality of source nodes (e.g., that comprise the one or more source intent nodes and/or the one or more source intent object nodes) may be connected via the plurality of source edges to indicate associations, such as "has" or "reference" associations, between the plurality of source nodes.

As a specific example, as shown in FIG. 1A, the source intent policy model may be represented as a graph that includes a first source intent node associated with a Source Intent A, a second source intent node associated with a Source Intent B, and a third source intent node associated with a Source Intent C; and a first source intent object node associated with a Source Intent Object 1, a second source intent object node associated with a Source Intent Object 2, and a third source intent object node associated with a Source Intent Object 3. The first source intent node may be connected to the second source intent node and the third source intent node via respective source edges (e.g., source "has" edges). In this way, the graph indicates that the second source intent node and the third source intent node depend from the first source intent node. The second source intent node may be connected to the first source intent object node and the second source intent object node via respective source edge (e.g., source "reference" edges), and the third source intent node may be connected to the second source intent object node and the third source intent object node via respective source edges (e.g., source reference edges). In this way, the graph indicates that the first source intent object node and the second source intent object node depend from the second source intent node, and the second source intent object node and the third source intent object node depend from the third source intent node.

In some implementations, each node of the source intent policy model may include information. The information may indicate, for example, a name of the source node, an identifier associated with the source node (e.g., a universally unique identifier (UUID) or another identifier associated with the source node), and/or a type of the source node (e.g., that indicates whether the source node is a source intent node or a source intent object node, or another type of node). Additionally, or alternatively, each source node may include, for example, information indicating which source nodes depend from the source node and/or information indicating from which source nodes the source node depends. For example, the first source intent object node (e.g., associated with the Source Intent Object B) may include information indicating that the first source intent object node depends from the second source intent node (e.g., that is associated with the Source Intent B); the second source intent object node (e.g., associated with the Source Intent Object 2) may include information indicating that the second source intent object node depends from the second source intent node (e.g., that is associated with Source Intent B) and the third source intent node (e.g., that is associated with the Source Intent C); and the third source intent object node (e.g., associated with the Source Intent Object 3) may include information indicating that the third source intent object node depends from the third source intent node (e.g., that is associated with the Source Intent C). As another example, the second source intent node (e.g., that is associated with the Source Intent B) may include information indicating that the second source intent node depends from the first source intent node (e.g., that is associated with the Source Intent A) and/or that the first source intent object node (e.g., associated with the Source Intent Object 1) and the second source intent object node (e.g., associated with the Source Intent Object 2) depend from the second source intent node; and the third source intent node (e.g., that is associated with the Source Intent C) may include information indicating that the third source intent node depends from the first source intent node (e.g., that is associated with the Source Intent A) and/or that the second source intent object node (e.g., associated with the Source Intent Object 2) and the third source intent object node (e.g., associated with the Source Intent Object 3) depend from the third source intent node.

Figure 1B:
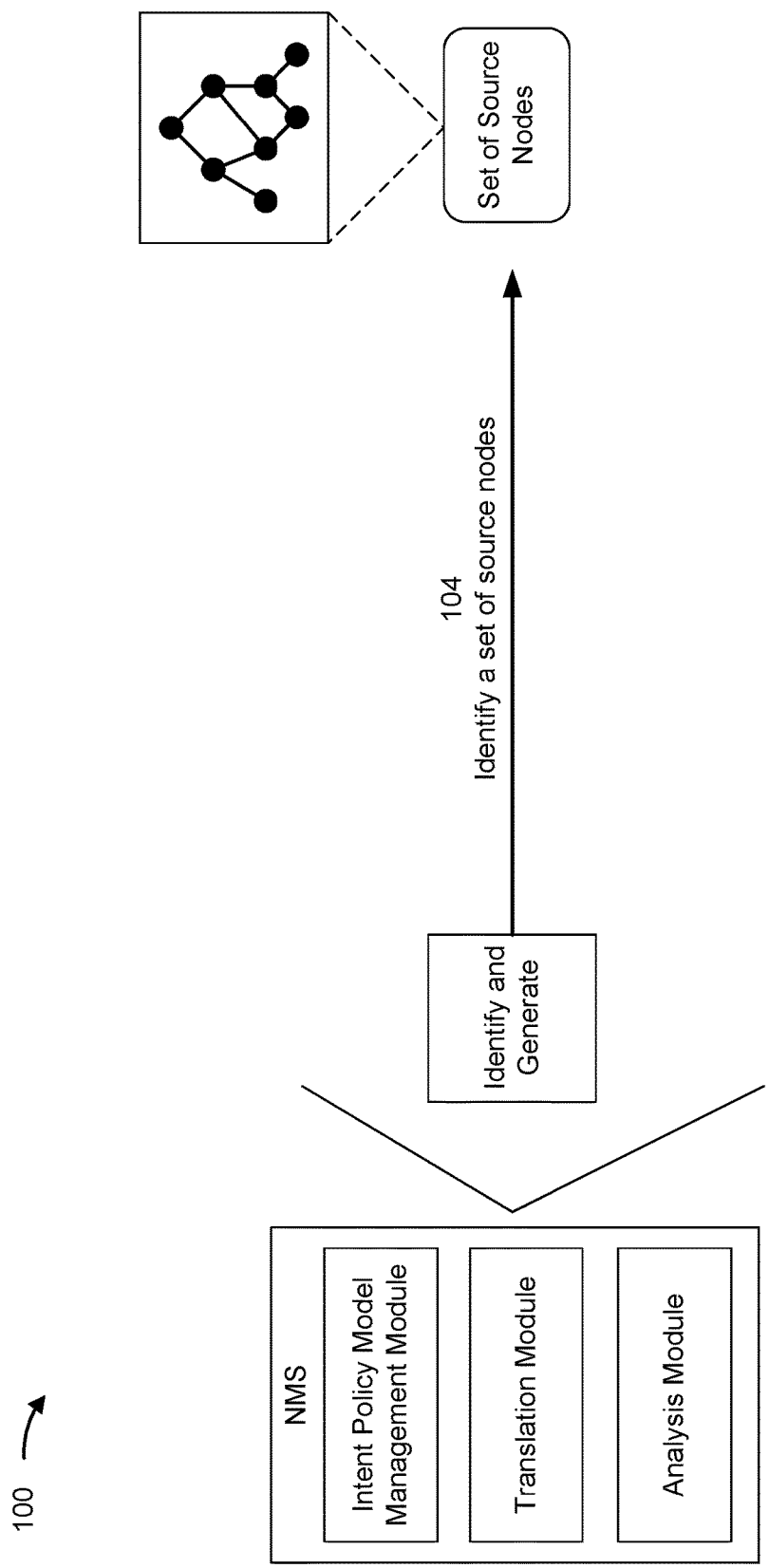

As shown in FIG. 1B, and by reference number 104, the NMS (e.g., using the intent policy model management module) may identify a set of source nodes (e.g., one or more source nodes) of the plurality of source nodes of the graph associated with the source intent policy model. The set of source nodes may be associated with source intents of the source intent policy model that are relevant to the network device (e.g., that can be implemented on the network device). In some implementations, a network administrator may interact with a user interface of the NMS to input a selection that identifies a first group of one or more source nodes of the plurality of source nodes of the graph associated with the source intent policy model. Alternatively, the NMS may include, or may obtain (e.g., from a data structure, such as a database, a table, a file, or another data structure) configuration information that identifies the group of one or more source nodes. The first group of one or more source nodes may be source nodes from which other source nodes depend, and may include, for example, one or more source intent nodes (and may not include one or more source intent object nodes). Accordingly, the NMS may identify a second group of one or more nodes, of the plurality of source nodes, that depend from the first group of one or more source nodes. For example, the second group of one or more source nodes may include one or more source intent nodes and/or one or more source intent object nodes that depend from the first group of one or more source nodes. Accordingly, the NMS may identify the set of source nodes as comprising the first group of one or more source nodes and, in some implementations, as also comprising the second group of one or more source nodes.

Figure 1C:
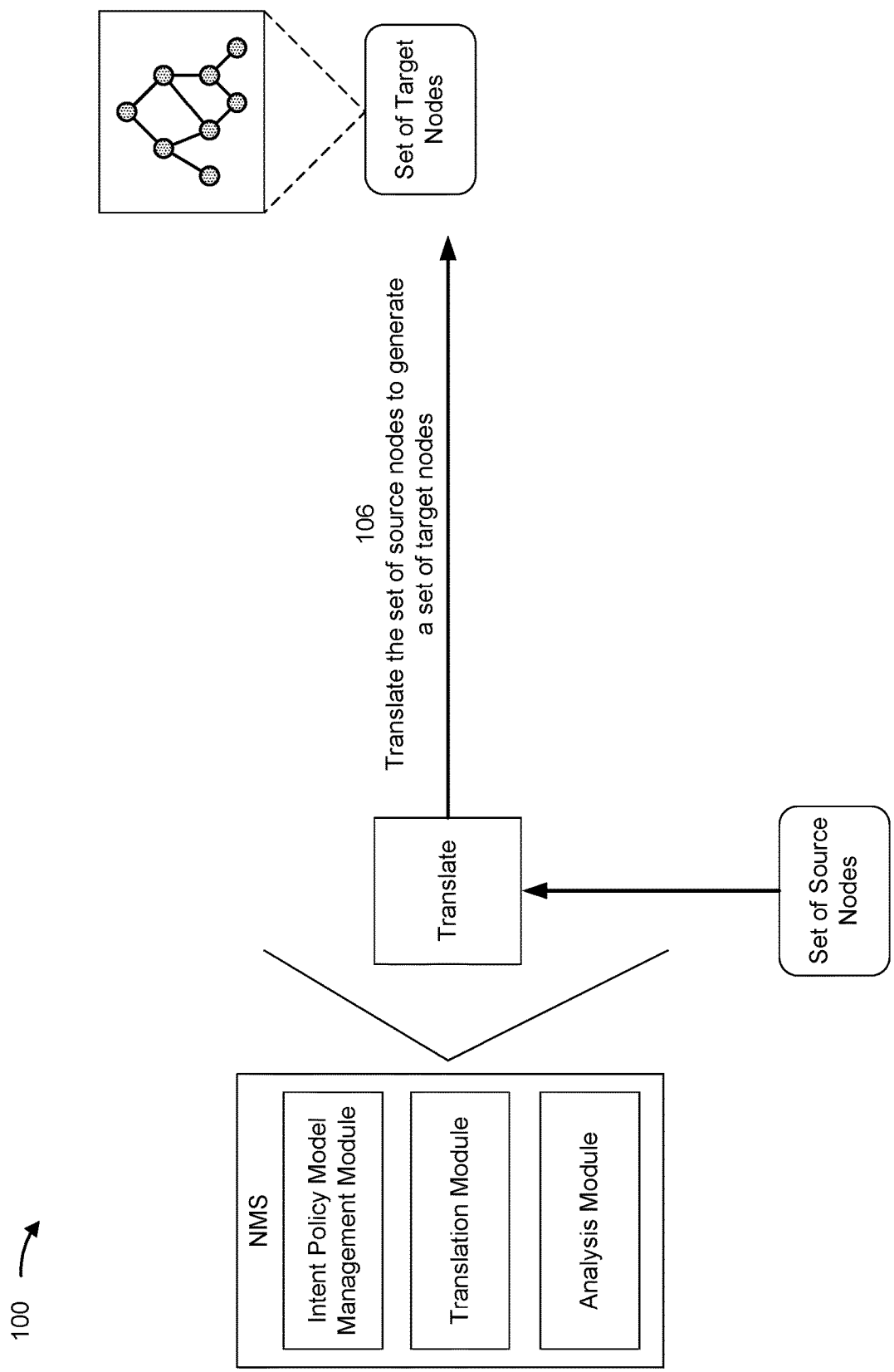

As shown in FIG. 1C, and by reference number 106, the NMS (e.g., using the translation module) may translate the set of source nodes to generate a set of target nodes. For example, the NMS may traverse the set of source nodes and may thereby translate each source node to at least one target node. The NMS may use a recursive technique, such as a depth first search technique, to traverse the set of source nodes. Accordingly, based on recursively traversing the set of source nodes, the NMS may translate each source node of the set of source nodes to generate the set of target nodes (e.g., in a depth first manner), such that each source node of the set of source nodes corresponds to at least one target node of the set of target nodes. The NMS may use a translation technique that is associated with the target intent policy model described herein to translate the set of source nodes to generate a set of target nodes. For example, the translation technique may indicate how information included in a source node is to be modified (if at all) and included in at least one target node, and/or may indicate how one or more source edges associated with the source node are to be modified (if at all) and associated with the at least one target node.

Figure 1D:
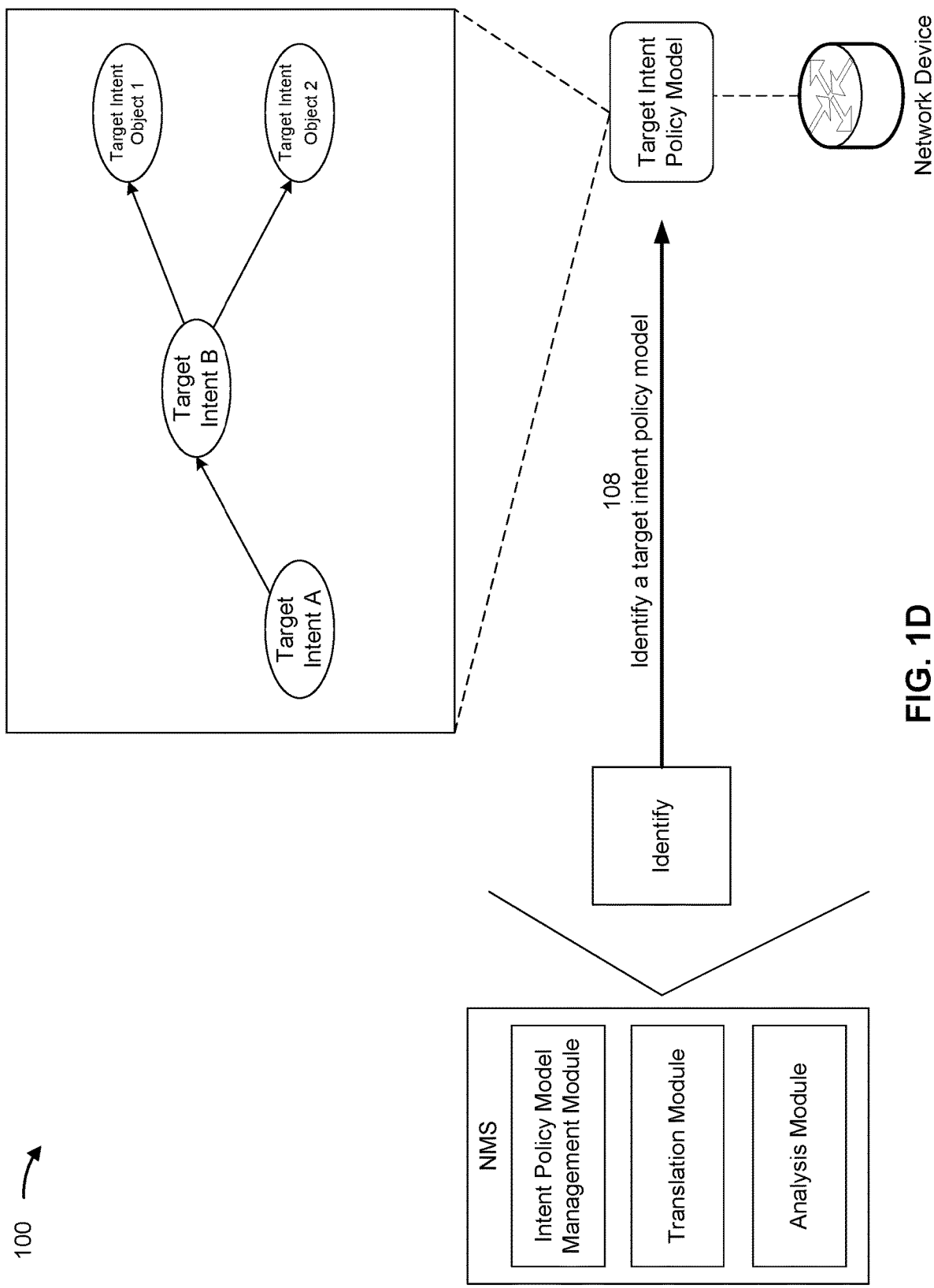

As shown in FIG. 1D, and by reference number 108, the NMS (e.g., using the intent policy model management module) may identify a target intent policy model (e.g., an intent policy model, such as for on-device services of the network device, that is to be updated as described herein). The target intent policy model may be a graph-based policy model, such as where target intents and target objects are represented as nodes, and relationships between target intents and target objects are represented as edges, or another type of intent-based model. For example, as shown in FIG. 1D, the target intent policy model may be associated with a graph having a plurality of target nodes connected by a plurality of target edges. The plurality of target nodes may include one or more intent nodes (e.g., where each target intent node is associated with a target intent) and/or one or more target intent object nodes (e.g., where each target intent object node is associated with a target intent object). The plurality of target nodes (e.g., that comprise the one or more target intent nodes and/or the one or more target intent object nodes) may be connected via the plurality of target edges to indicate associations, such as "has" or "reference" associations, between the plurality of target nodes.

As a specific example, as shown in FIG. 1D, the target intent policy model may be represented as a graph that includes a first target intent node associated with a Target Intent A and a second target intent node associated with a Target Intent 1B; and a first target intent object node associated with a Target Intent Object 1 and a second target intent object node associated with a Target Intent Object 2. The first target intent node may be connected to the second target intent node via a target edge (e.g., a target "has" edge). In this way, the graph indicates that the second source intent node depends from the first source intent node. The second target intent node may be connected to the first target intent object node and the second target intent object node via respective target edges (e.g., target "reference" edges). In this way, the graph indicates that the first target intent object node and the second target intent object node depend from the second target intent node.

In some implementations, each node of the target intent policy model may include information. The information may indicate, for example, a name of the target node, an identifier associated with the target node (e.g., a universally unique identifier (UUID) or another identifier associated with the target node), and/or a type of the target node (e.g., that indicates whether the target node is a target intent node or a target intent object node, or another type of node). Additionally, or alternatively, each target node may include, for example, information indicating which target nodes depend from the target node and/or information indicating from which target nodes the target node depends. For example, the first target intent object node (e.g., associated with the Target Intent Object 1) may include information indicating that the first target intent object node depends from the second target intent node (e.g., that is associated with the Target Intent 1); the second target intent object node (e.g., associated with the Target Intent Object 2) may include information indicating that the second target intent object node depends from the second target intent node (e.g., that is associated with Target Intent 1); and the second target intent node (e.g., that is associated with the Target Intent 1) may include information indicating that the second target intent node depends from the first target intent node (e.g., that is associated with the Target Intent A) and/or that the first target intent object node (e.g., associated with the Target Intent Object 1) and the second target intent object node (e.g., associated with the Target Intent Object 2) depend from the second target intent node.

In some implementations, the target intent policy model may be associated with the source intent policy model. For example, when the source intent policy model is associated with cloud services of a particular type (e.g., security services) that can be applied on multiple, different network devices (including the network device described herein) and the target intent policy model is associated with on-device services of the particular type that are to be applied on the network device described herein, the target policy model may include some (but not all) of the same, or similar, intents of the source intent policy model (e.g., prior to the target policy model being updated as described herein).

Figure 1E:
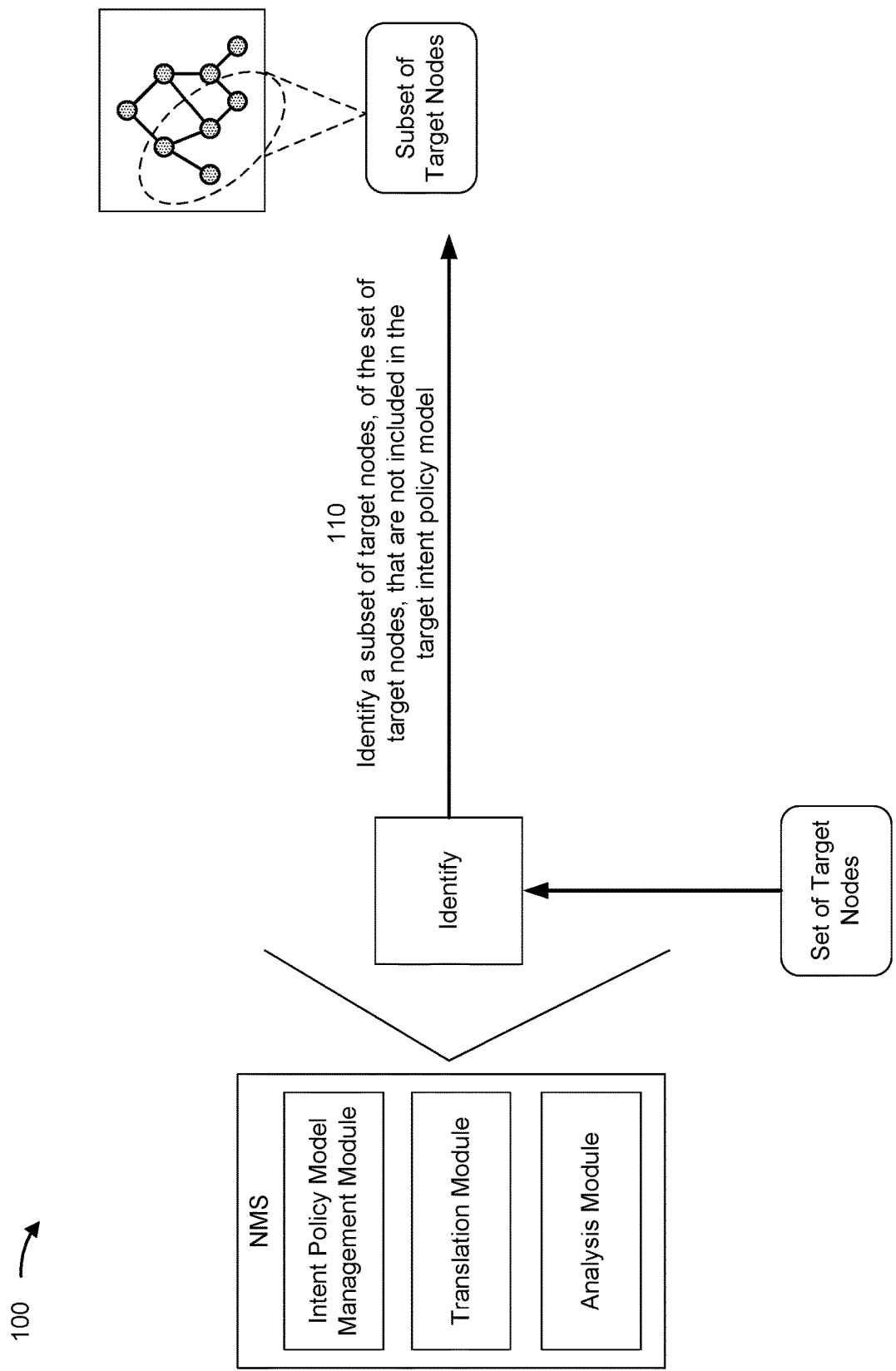

As shown in FIG. 1E, and by reference number 110, the NMS (e.g., using the analysis module) may identify a subset of target nodes (e.g., one or more target nodes), of the set of target nodes (e.g., that correspond to the set of source nodes), that are not included in the target intent policy model (e.g., that is associated with the graph having a plurality of target nodes connected by the plurality of target edges). For example, for each target node of the set of target nodes, the NMS may process (e.g., using a hashing technique) the target node (e.g., process at least some of the information included in the target node) to determine a hash value associated with the target node. The NMS then may determine whether one of the plurality of target nodes (e.g., that are associated with the plurality of target nodes) is associated with the hash value. For example, the NMS may process each of the plurality of target nodes to determine respective hash values associated with the plurality of target nodes (or may obtain the respective hash values from a data structure). The NMS then may search the respective hash values to determine whether any one of the hash values matches (e.g., is equal to) the hash value associated with the target node. Accordingly, when the NMS determines that one of the plurality of target nodes is associated with the hash value (e.g., a positive match determination is made), the NMS may determine that the target node is already included in the target intent policy model and may therefore refrain from performing any additional action associated with the target node. Alternatively, when the NMS determines that not one of the plurality of target nodes is associated with the hash value (e.g., a negative match determination is made), the NMS may determine that the target node is not included in the target intent policy model and may therefore identify the subset of target nodes as comprising the target node. The NMS may also identify the subset of target nodes as comprising one or more target nodes, of the set of target nodes, that depend from the target node.

Figure 1F:
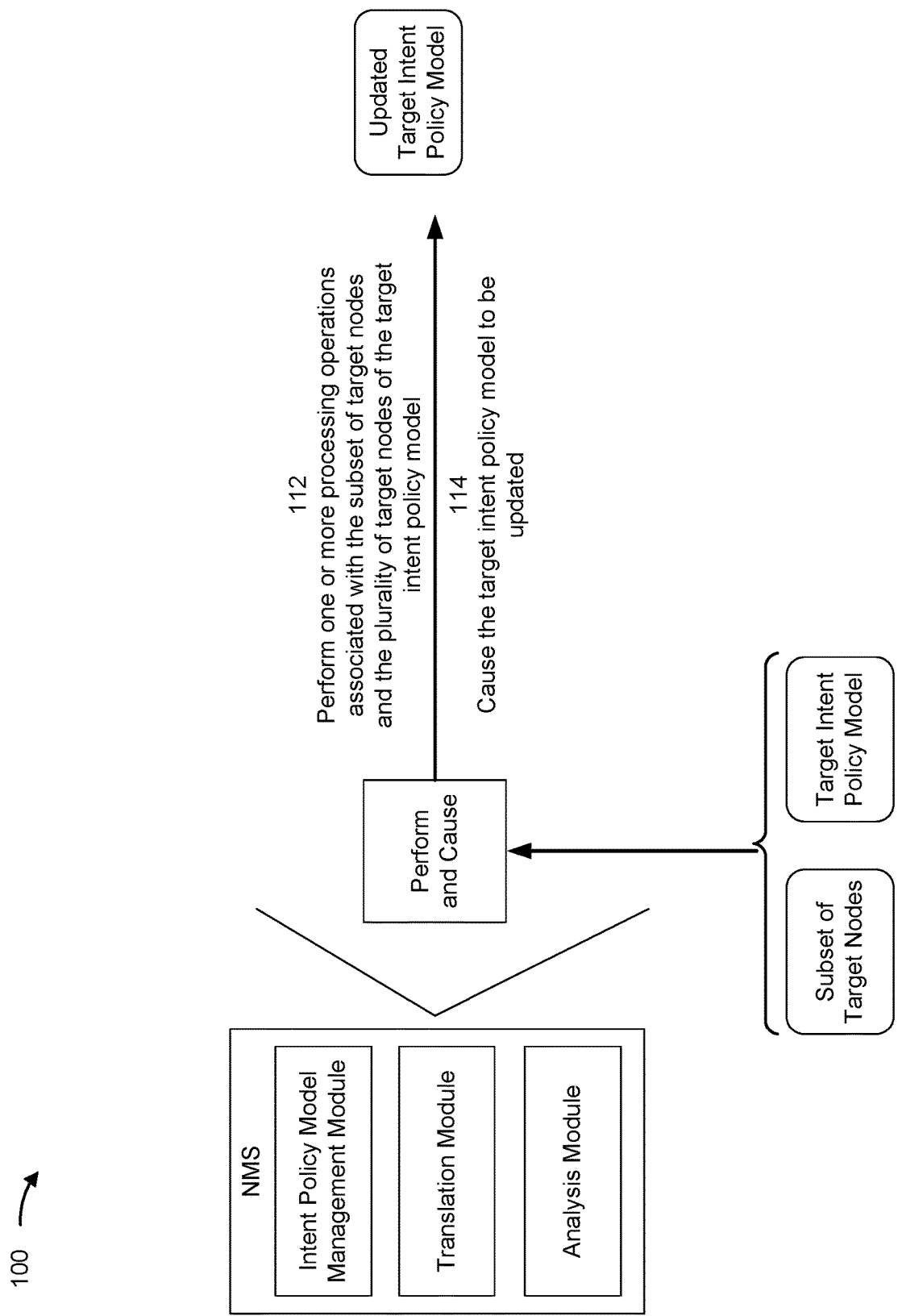

As shown in FIG. 1F, and by reference number 112, the NMS (e.g., using the analysis module) may perform one or more processing operations associated with the subset of target nodes and the plurality of target nodes (e.g., of the target intent policy model).

In some implementations, the one or more processing operations may include determining a hierarchical order associated with the subset of target nodes and the plurality of target nodes. For example, the NMS may determine whether a first target node of the subset of target nodes is to depend from a second target node of the plurality of target nodes, or vice versa. A target node is considered to be ordered before another target node in the hierarchical order when the other target node depends (e.g., directly or indirectly) from the target node. Accordingly, the NMS may determine a hierarchical order in which target nodes (of the subset of target nodes and the plurality of target nodes) associated with "specific" target intents are ordered before other target nodes (of the subset of target nodes and the plurality of target nodes) associated with "broad" target intents. For example, in a security firewall intent policy context, the NMS may determine that one or more target nodes associated with allowing a marketing user group to access a marketing website is ordered before one or more target nodes associated with allowing all user groups to access the Internet.

In some implementations, the one or more processing operations may include identifying one or more conflicts between the subset of target nodes and the plurality of target nodes. A conflict exists when at least two target nodes of the subset of target nodes and the plurality of target nodes are associated with contradictory target intents (e.g., target intents associated with different actions for the same, or similar, target resources or objects). For example, in the security firewall intent policy context, the NMS may determine that one or more target nodes that are associated with allowing the marketing user group to access a marketing website conflicts with one or more target nodes that are associated with denying the marketing user group access to the marketing website. In some implementations, the NMS may determine that a first target node, of the subset of target nodes, and a second target node, of the plurality of target nodes, conflict with each other. For example, the NMS may compare at least some of the information included in the first target node and at least some of the information included in the second target node (e.g., that corresponds to the at least some of the information included in the first target node) to determine that the first target node and the second target node conflict with each other. The NMS may provide information indicating that the NMS identified the one or more conflicts (e.g., information indicating that the NMS determined that the first target node and the second target node conflict with each other), such that the information can be presented to a network administrator (e.g., via a display screen associated with the NMS).

Further, the one or more operations may include resolving the one or more conflicts between the subset of target nodes and the plurality of target nodes (e.g., that are identified by the NMS). In some implementations, the NMS may remove at least one target node, of the subset of target nodes and the plurality of target nodes, that conflicts with at least one other target node of the subset of target nodes and the plurality of target node. Alternatively, the NMS cause conflicting target nodes to be ordered in a particular manner (e.g., in the hierarchical order). For example, based on determining that a first target node, of the subset of target nodes, and a second target node, of the plurality of target nodes, conflict with each other, the NMS may cause the second target node to be ordered before the first target node in the hierarchical order (or vice versa). In this way, a precedence relationship (or dependency relationship) between the first target node and the second target node may be established in the hierarchical order.

In some implementations, the one or more processing operations may include identifying one or more redundancies between the subset of target nodes and the plurality of target nodes. A redundancy exists when at least two target nodes, of the subset of target nodes and the plurality of target nodes, are associated with matching target intents (e.g., target intents associated with the same, or similar, actions for the same, or similar, target resources or objects). For example, in the security firewall intent policy context, the NMS may determine that one or more target nodes associated with allowing the marketing user group to access a marketing website are redundant with one or more other target nodes associated with allowing all user groups access to the Internet. In some implementations, the NMS may determine that a target node, of the subset of target nodes and the plurality of target nodes, is redundant with another target node of the subset of target nodes and the plurality of target nodes. For example, the NMS may compare at least some of the information included in the target node and at least some of the information included in the other target node (e.g., that corresponds to the at least some of the information included in the first target node) to determine that the target node is redundant with the other target node. The NMS may provide information indicating that the NMS identified the one or more redundancies (e.g., information indicating that the NMS determined that the target node is redundant with the other target node), such that the information can be presented to a network administrator (e.g., via display the screen associated with the NMS).

Further, the one or more operations may include resolving the one or more redundancies between the subset of target nodes and the plurality of target nodes (e.g., that are identified by the NMS). In some implementations, the NMS may remove at least one target node, of the subset of target nodes and the plurality of target nodes, that is redundant with at least one other target node of the subset of target nodes and the plurality of target node. For example, based on determining that a target node is redundant with another target node, the NMS may remove the target node (or the other target node) from the subset of target nodes and the plurality of target nodes. In this way, a size of the subset of target nodes and the plurality of target nodes may be reduced.

As shown by reference number 114, the NMS (e.g., using the intent policy model management model) may cause the target intent policy model to be updated (e.g., based on performing the one or more processing operations). For example, the NMS may cause the target intent policy model to be updated to include the subset of target nodes and the plurality of target nodes (e.g., after identifying and/or resolving conflicts and/or redundancies), such that that the graph associated with the target intent policy model is ordered according to the hierarchical order. In this way, the target intent policy model may be updated to be the same, or similar, as the source intent policy model (but formatted and ordered in a manner to enable the target intent policy model to be deployed on the network device).

In some implementations, the NMS (e.g., using the intent policy model management model) may maintain a mapping, or other data structure, that indicates a correspondence between source nodes of the graph associated with the source intent policy model and the target nodes of the graph associated with the target intent policy model (e.g., after the target intent policy model is updated). Accordingly, the NMS may identify (e.g., using the intent policy model management model) a change to a particular source node of the plurality of source nodes of the graph associated with the target intent policy model (e.g., due to updates to a particular source intent and/or a particular source intent object that are associated with the particular source node). For example, the NMS may identify a change to at least some of the information included in the particular source node. The NMS may therefore identify a group of one or more source nodes, of the plurality of source nodes, that includes the particular source node. The group of one or more source nodes may include the particular source node and may also include one or more source nodes that depend from the particular source node. The NMS may translate the group of one or more source nodes to generate a group of one or more target nodes (e.g., in a similar manner as that described herein in relation to FIG. 1C and reference number 106). The NMS may further cause the target intent policy model to be updated based on the group of one or more source nodes.

For example, for each target node, of the group of target nodes, the NMS may identify a corresponding target node of the graph associated with the target intent policy model (e.g., of the subset of target nodes and the plurality of target nodes included in the graph). The NMS may determine whether the target node matches the corresponding target node (e.g., whether information included in the target node is the same as information included in the corresponding target node). Accordingly, the NMS may replace the corresponding target node with the target node (e.g., in the graph) based on determining that the target node does not match the corresponding target node. Otherwise, the NMS may remove the target node from the group of target nodes.

As indicated above, FIGS. 1A-1F are provided as an example. Other examples may differ from what is described with regard to FIGS. 1A-1F.

Figure 2:
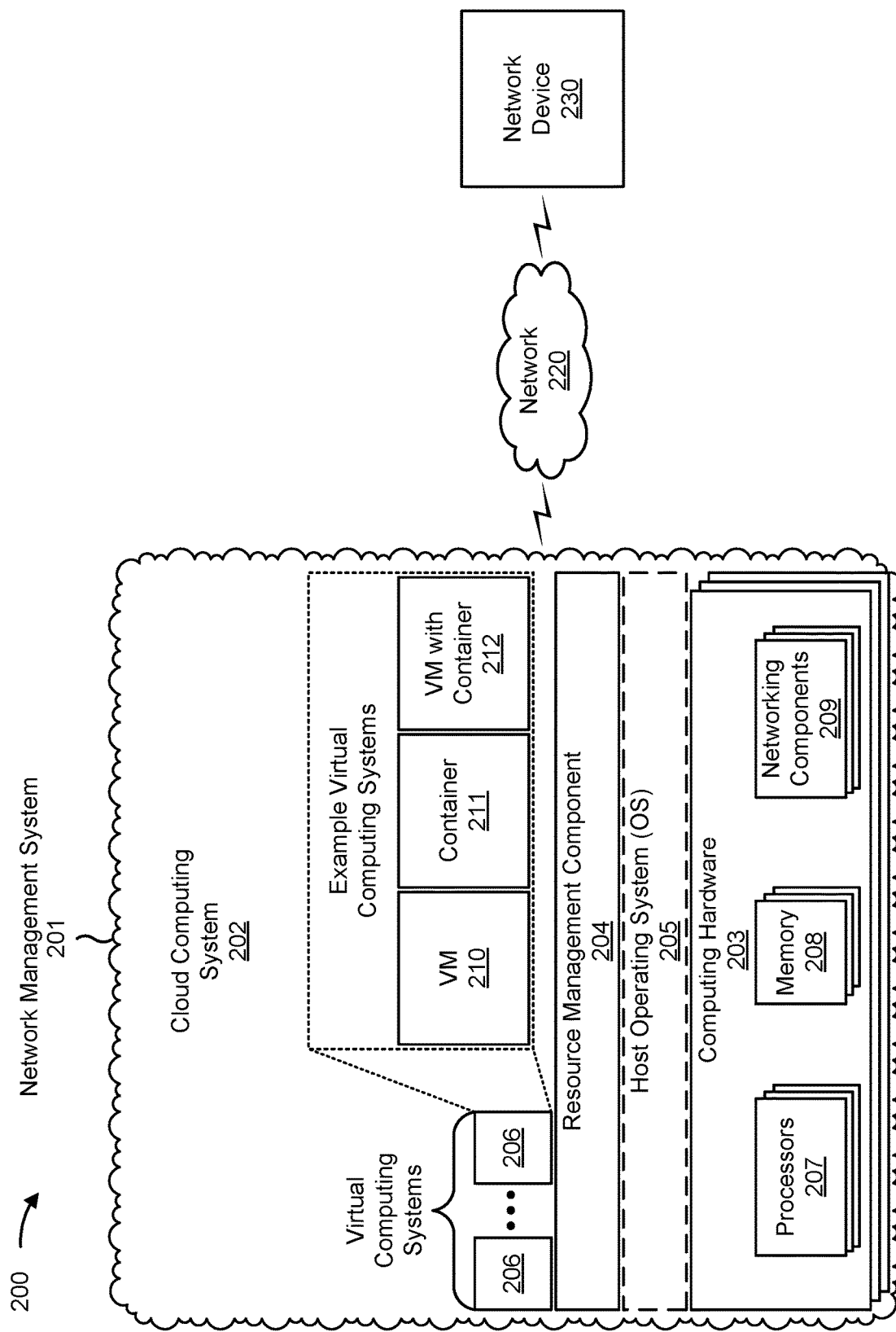
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network management system 201, which may include one or more elements of and/or may execute within a cloud computing system 202. The cloud computing system 202 may include one or more elements 203-212, as described in more detail below. As further shown in FIG. 2, environment 200 may include a network 220 and/or a network device 230. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the network management system 201 may include one or more elements 203-212 of the cloud computing system 202, may execute within the cloud computing system 202, and/or may be hosted within the cloud computing system 202, in some implementations, the network management system 201 may not be cloud-based (e.g., may be implemented outside of a cloud computing system) or may be partially cloud-based. For example, the network management system 201 may include one or more devices that are not part of the cloud computing system 202, such as device 300 of FIG. 3 or device 400 of FIG. 4, which may include a standalone server or another type of computing device. The network management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The network device 230 includes one or more devices capable of receiving, processing, storing, routing, and/or providing traffic (e.g., a packet or other information or metadata) in a manner described herein. For example, the network device 230 may include a router, such as a label switching router (LSR), a label edge router (LER), an ingress router, an egress router, a provider router (e.g., a provider edge router or a provider core router), a virtual router, or another type of router. Additionally, or alternatively, the network device 230 may include a gateway, a switch, a firewall, a hub, a bridge, a reverse proxy, a server (e.g., a proxy server, a cloud server, or a data center server), a load balancer, and/or a similar device. In some implementations, the network device 230 may be a physical device implemented within a housing, such as a chassis. In some implementations, the network device 230 may be a virtual device implemented by one or more computer devices of a cloud computing environment or a data center. In some implementations, a group of network devices 230 may be a group of data center nodes that are used to route traffic flow through network 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
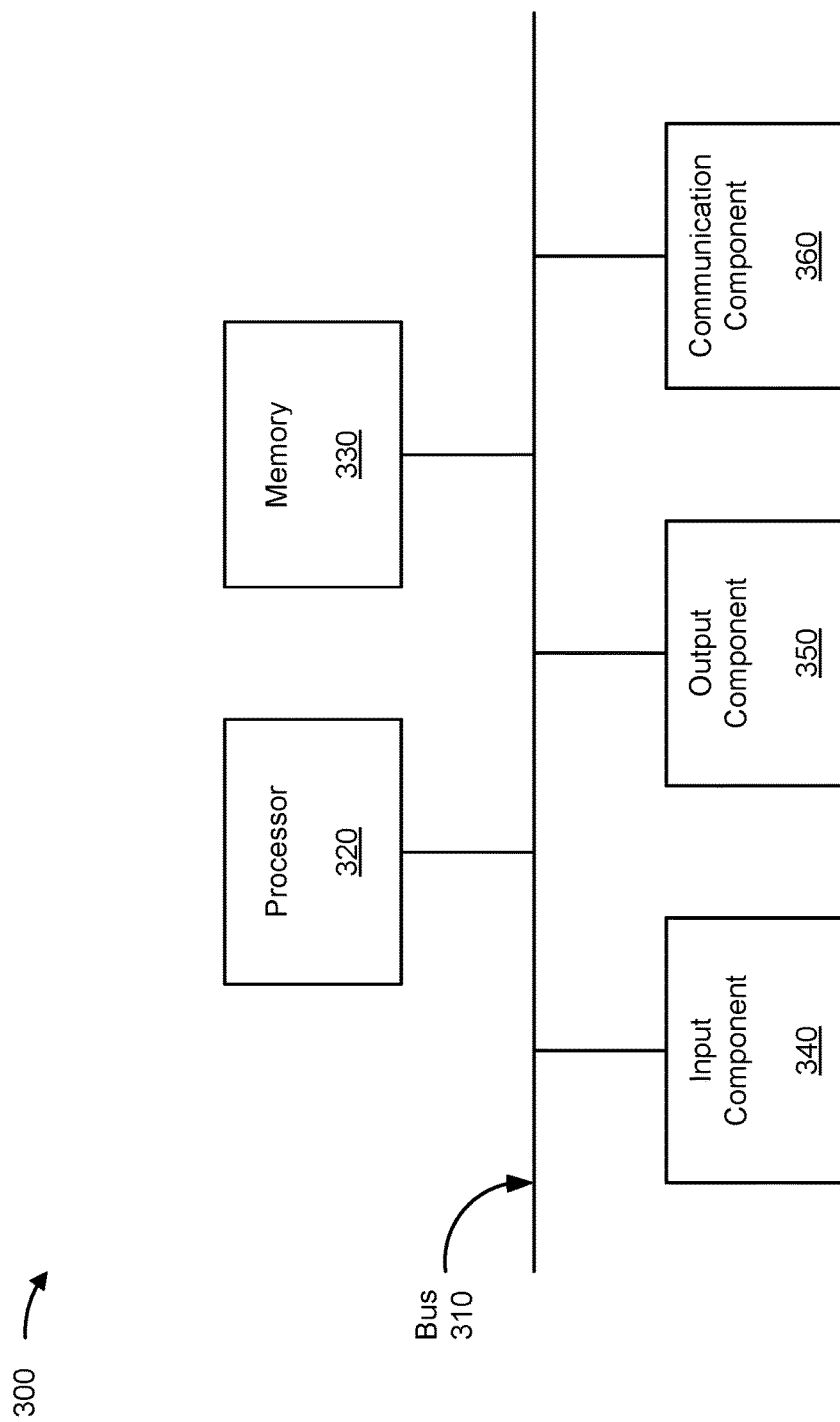
FIGS. 3-4 are diagrams of example components of devices associated with translation of a source intent policy model to a target intent policy model.

FIG. 3 is a diagram of example components of a device 300 associated with translation of a source intent policy model to a target intent policy model. The device 300 may correspond to the network management system 201, the computing hardware 203, and/or the network device 230. In some implementations the network management system 201, the computing hardware 203, and/or the network device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
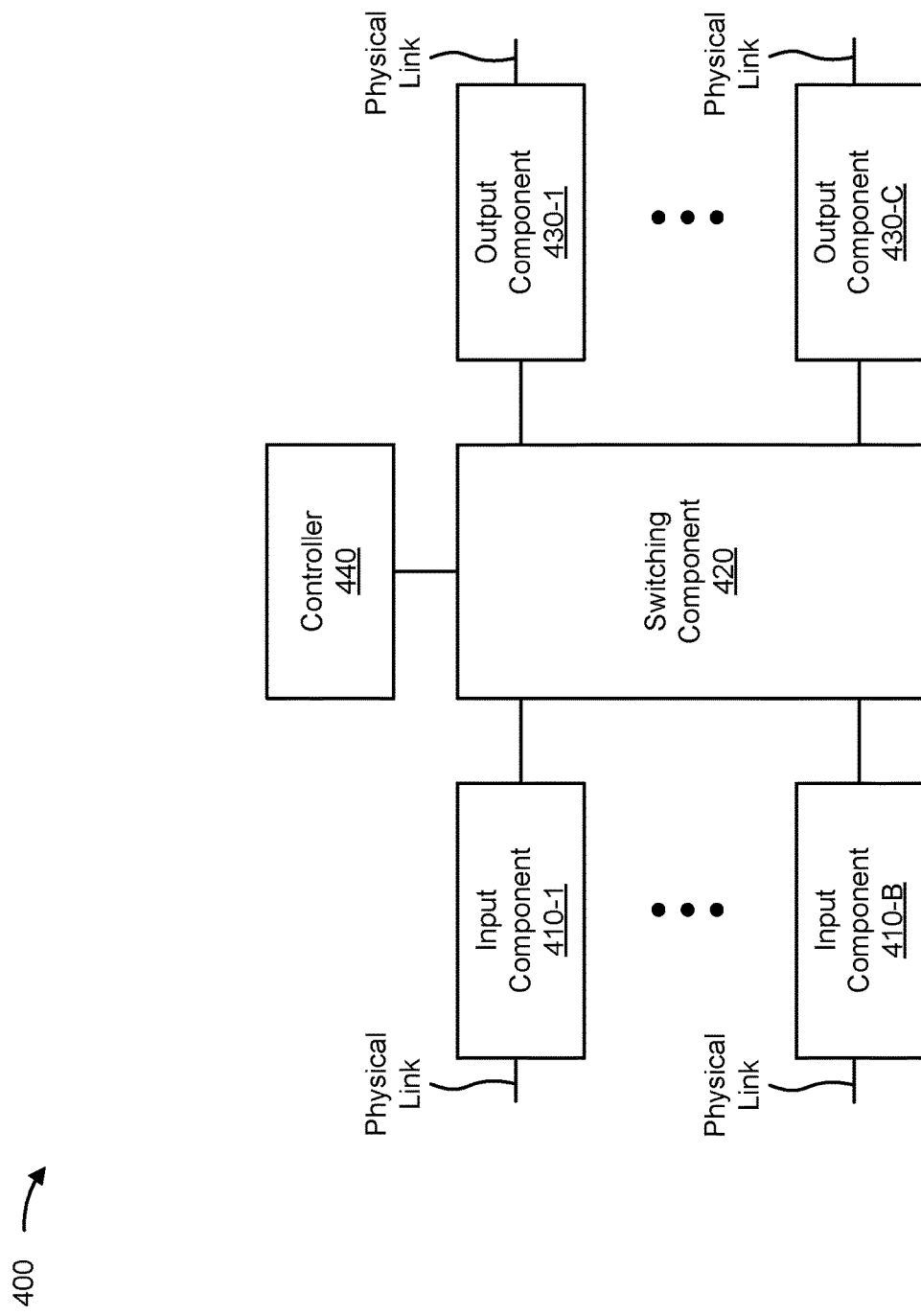

FIG. 4 is a diagram of example components of a device 400 associated with translation of a source intent policy model to a target intent policy model. Device 400 may correspond to the network management system 201, the computing hardware 203, and/or the network device 230. In some implementations, the network management system 201, the computing hardware 203, and/or the network device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
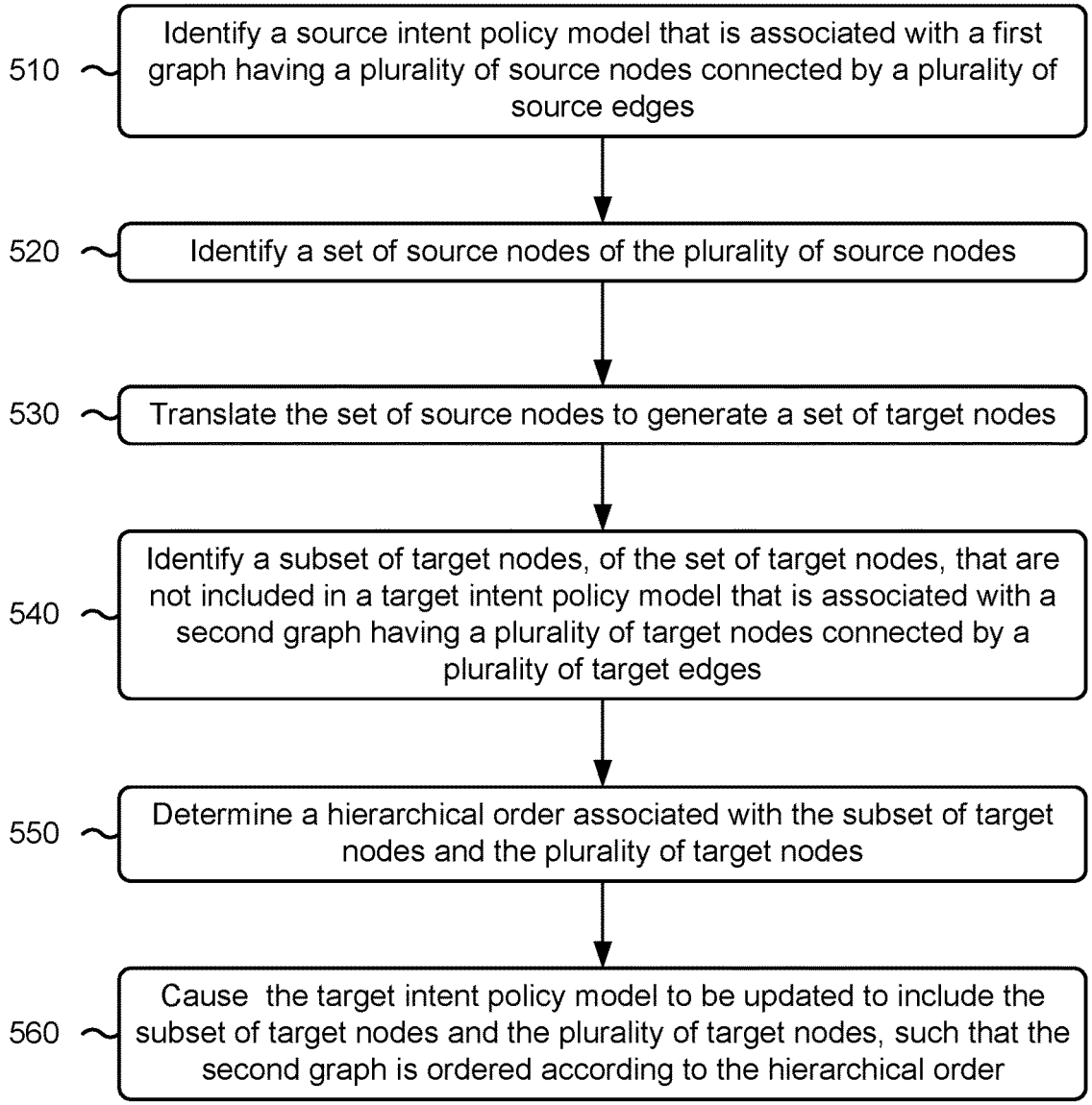
FIG. 5 is a flowchart of an example process associated with translation of a source intent policy model to a target intent policy model.

FIG. 5 is a flowchart of an example process 500 associated with translation of a source intent policy model to a target intent policy model. In some implementations, one or more process blocks of FIG. 5 are performed by a system (e.g., the network management system 201). In some implementations, one or more process blocks of FIG. 5 are performed by another device or a group of devices separate from or including the system, such as a network device (e.g., the network device 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include identifying a source intent policy model that is associated with a first graph having a plurality of source nodes connected by a plurality of source edges (block 510). For example, the system may identify a source intent policy model that is associated with a first graph having a plurality of source nodes connected by a plurality of source edges, as described above.

As further shown in FIG. 5, process 500 may include identifying a set of source nodes of the plurality of source nodes (block 520). For example, the system may identify a set of source nodes of the plurality of source nodes, as described above.

As further shown in FIG. 5, process 500 may include translating the set of source nodes to generate a set of target nodes (block 530). For example, the system may translate the set of source nodes to generate a set of target nodes, as described above.

As further shown in FIG. 5, process 500 may include identifying a subset of target nodes, of the set of target nodes, that are not included in a target intent policy model that is associated with a second graph having a plurality of target nodes connected by a plurality of target edges (block 540). For example, the system may identify a subset of target nodes, of the set of target nodes, that are not included in a target intent policy model that is associated with a second graph having a plurality of target nodes connected by a plurality of target edges, as described above.

As further shown in FIG. 5, process 500 may include determining a hierarchical order associated with the subset of target nodes and the plurality of target nodes (block 550). For example, the system may determine a hierarchical order associated with the subset of target nodes and the plurality of target nodes, as described above.

As further shown in FIG. 5, process 500 may include causing the target intent policy model to be updated to include the subset of target nodes and the plurality of target nodes, such that the second graph is ordered according to the hierarchical order (block 560). For example, the system may cause the target intent policy model to be updated to include the subset of target nodes and the plurality of target nodes, such that the second graph is ordered according to the hierarchical order, as described above.

Process 500 may include additional implementations, such as any single implementation or any combination of implementations described below and/or in connection with one or more other processes described elsewhere herein.

In a first implementation, the plurality of source nodes includes one or more source intent nodes that are each associated with a source intent of the source intent policy model, the plurality of source nodes includes one or more source intent object nodes that are each associated with a source intent object of the source intent policy model, and the plurality of source edges indicate associations between the plurality of source nodes.

In a second implementation, alone or in combination with the first implementation, identifying the set of source nodes comprises identifying a first group of source nodes of the plurality of source nodes, identifying a second group of source nodes, of the plurality of source nodes, that depend from the first group of source nodes, and identifying the set of source nodes as comprising the first group of source nodes and the second group of source nodes.

In a third implementation, alone or in combination with one or more of the first and second implementations, translating the set of source nodes to generate the set of target nodes comprises traversing, using a depth first search technique, the set of source nodes, and translating, using a translation technique and based on the traversing the set of source nodes, a source node to a target node, wherein the translation technique is associated with the target intent policy model.

In a fourth implementation, alone or in combination with one or more of the first through third implementations, the plurality of target nodes includes one or more target intent nodes that are each associated with a target intent of the target intent policy model, the plurality of target nodes includes one or more target intent object nodes that are each associated with a target intent object of the target intent policy model, and the plurality of target edges indicate associations between the plurality of target nodes.

In a fifth implementation, alone or in combination with one or more of the first through fourth implementations, identifying the subset of target nodes that are not included in the target intent policy model comprises for each target node of the set of target nodes processing the target node to determine a hash value, determining whether one of the plurality of target nodes is associated with the hash value, and identifying the subset of target nodes as comprising the target node based on determining that one of the plurality of target nodes is not associated with the hash value.

In a sixth implementation, alone or in combination with one or more of the first through fifth implementations, process 500 includes determining, based on determining the hierarchical order associated with the subset of target nodes and the plurality of target nodes, that a first target node, of the subset of target nodes, and a second target node, of the plurality of target nodes, conflict with each other.

In a seventh implementation, alone or in combination with one or more of the first through sixth implementations, process 500 includes causing, based on determining that the first target node and the second target node conflict with each other, the second target node to be ordered before the first target node in the hierarchical order.

In an eighth implementation, alone or in combination with one or more of the first through seventh implementations, process 500 includes identifying, based on determining the hierarchical order associated with the subset of target nodes and the plurality of target nodes, that a target node, of the subset of target nodes and the plurality of target nodes, is redundant with another target node, of the subset of target nodes and the plurality of target nodes, and removing the target node from the subset of target nodes and the plurality of target nodes.

In a ninth implementation, alone or in combination with one or more of the first through eighth implementations, process 500 includes identifying, after causing the target intent policy model to be updated, a change to a particular source node of the plurality of source nodes; identifying a group of one or more source nodes, of the plurality of source nodes, that includes the particular source node, translating the group of one or more source nodes to generate a group of one or more target nodes; and for each target node of the group of one or more target nodes identifying a corresponding target node, of the subset of target nodes and the plurality of target nodes, determining whether the target node matches the corresponding target node, and replacing the corresponding target node with the target node based on determining that the target node does not match the corresponding target node.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by a system, a source intent policy model that is associated with a first graph having a plurality of source nodes connected by a plurality of source edges, wherein the source intent policy model is associated with cloud services for one or more network devices;
   identifying, by the system, a set of source nodes of the plurality of source nodes;
   translating, by the system, the set of source nodes to generate a set of target nodes,
      wherein translating the set of source nodes comprises:
         recursively traversing the set of source nodes to generate the set of target nodes,
            wherein each source node of the set of source nodes corresponds to at least one target node of the set of target nodes;
   identifying, by the system, a subset of target nodes, of the set of target nodes, that are not included in a target intent policy model that is associated with a second graph having a plurality of target nodes connected by a plurality of target edges,
      wherein the target intent policy model is associated with on-device services of a network device of the one or more network devices;
   determining, by the system, a hierarchical order associated with the subset of target nodes and the plurality of target nodes;
   identifying and resolving by the system:
      one or more conflicts between the subset of target nodes and the plurality of target nodes, or
      one or more redundancies between the subset of target nodes and the plurality of target nodes; and
   causing, by the system, the target intent policy model to be updated to include the subset of target nodes and the plurality of target nodes based on identifying and resolving the one or more conflicts or the one or more redundancies, such that the second graph is ordered according to the hierarchical order.

2. The method of claim 1, wherein:
the plurality of source nodes includes one or more source intent nodes that are each associated with a source intent of the source intent policy model,
the plurality of source nodes includes one or more source intent object nodes that are each associated with a source intent object of the source intent policy model, and
the plurality of source edges indicate associations between the plurality of source nodes.

3. The method of claim 1, wherein identifying the set of source nodes comprises:
identifying a first group of source nodes of the plurality of source nodes;
identifying a second group of source nodes, of the plurality of source nodes, that depend from the first group of source nodes; and
identifying the set of source nodes as comprising the first group of source nodes and the second group of source nodes.

4. The method of claim 1, wherein translating the set of source nodes to generate the set of target nodes comprises:
traversing, using a depth first search technique, the set of source nodes; and
translating, using a translation technique and based on traversing the set of source nodes, a source node to a target node,
wherein the translation technique is associated with the target intent policy model.

5. The method of claim 1, wherein:
the plurality of target nodes includes one or more target intent nodes that are each associated with a target intent of the target intent policy model,
the plurality of target nodes includes one or more target intent object nodes that are each associated with a target intent object of the target intent policy model, and
the plurality of target edges indicate associations between the plurality of target nodes.

6. The method of claim 1, wherein identifying the subset of target nodes that are not included in the target intent policy model comprises:
for each target node of the set of target nodes:
processing the target node to determine a hash value;
determining whether one of the plurality of target nodes is associated with the hash value; and
identifying the subset of target nodes as comprising the target node based on determining that one of the plurality of target nodes is not associated with the hash value.

7. The method of claim 1, wherein identifying and resolving one or more conflicts between the subset of target nodes and the plurality of target nodes comprises:
determining, based on determining the hierarchical order associated with the subset of target nodes and the plurality of target nodes, that a first target node, of the subset of target nodes, and a second target node, of the plurality of target nodes, conflict with each other.

8. The method of claim 7, further comprising:
causing, based on determining that the first target node and the second target node conflict with each other, the second target node to be ordered before the first target node in the hierarchical order.

9. The method of claim 1, wherein identifying and resolving one or more redundancies between the subset of target nodes and the plurality of target nodes comprises:
identifying, based on determining the hierarchical order associated with the subset of target nodes and the plurality of target nodes, that a target node, of the subset of target nodes and the plurality of target nodes, is redundant with another target node, of the subset of target nodes and the plurality of target nodes; and
removing the target node from the subset of target nodes and the plurality of target nodes.

10. The method of claim 1, further comprising:
identifying, after causing the target intent policy model to be updated, a change to a particular source node of the plurality of source nodes;
identifying a group of one or more source nodes, of the plurality of source nodes, that includes the particular source node;
translating the group of one or more source nodes to generate a group of one or more target nodes; and
for each target node of the group of one or more target nodes:
identifying a corresponding target node, of the subset of target nodes and the plurality of target nodes,
determining whether the target node matches the corresponding target node, and
replacing the corresponding target node with the target node based on determining that the target node does not match the corresponding target node.

11. A non-transitory computer-readable medium storing a set of instructions, the set of instructions comprising:
one or more instructions that, when executed by one or more processors of a system, cause the system to:
identify a source intent policy model that is associated with a first graph having a plurality of source nodes connected by a plurality of source edges,
wherein the source intent policy model is associated with cloud services for one or more network devices;
identify a set of source nodes of the plurality of source nodes;
translate the set of source nodes to generate a set of target nodes,
wherein the one or more instructions, that cause the system to translate the set of source nodes, cause the system to:
recursively traverse the set of source nodes to generate the set of target nodes,
wherein each source node of the set of source nodes corresponds to at least one target node of the set of target nodes;
identify a subset of target nodes, of the set of target nodes, that are not included in a target intent policy model that is associated with a second graph having a plurality of target nodes connected by a plurality of target edges,
wherein the target intent policy model is associated with on-device services of a network device of the one or more network devices;
identify and resolve:
one or more conflicts between the subset of target nodes and the plurality of target nodes, or
one or more redundancies between the subset of target nodes and the plurality of target nodes; and
cause the target intent policy model to be updated to include the subset of target nodes and the plurality of target nodes based on a hierarchical order associated with the subset of target nodes or the plurality of target nodes.

12. The non-transitory computer-readable medium of claim 11, wherein the one or more instructions, that cause the system to identify the set of source nodes, cause the system to:
  identify a first group of source nodes of the plurality of source nodes;
  identify a second group of source nodes, of the plurality of source nodes, that depend from the first group of source nodes; and
  identify the set of source nodes as comprising the first group of source nodes and the second group of source nodes.

13. The non-transitory computer-readable medium of claim 11, wherein the one or more instructions, that cause the system to identify and resolve one or more conflicts between the subset of target nodes and the plurality of target nodes, cause the system to:
  determine that a first target node, of the subset of target nodes, and a second target node, of the plurality of target nodes, conflict with each other; and
  cause, based on determining that the first target node and the second target node conflict with each other, the second target node to be ordered before the first target node in a hierarchical order of the second graph.

14. The non-transitory computer-readable medium of claim 11, wherein the one or more instructions, that cause the system to identify and resolve one or more redundancies between the subset of target nodes and the plurality of target nodes, cause the system to:
  identify that a target node, of the subset of target nodes and the plurality of target nodes, is redundant with another target node, of the subset of target nodes and the plurality of target nodes; and
  remove the target node from the subset of target nodes and the plurality of target nodes.

15. The non-transitory computer-readable medium of claim 11, wherein the one or more instructions further cause the system to:
  identify, after causing the target intent policy model to be updated, a change to a particular source node of the plurality of source nodes;
  identify a group of one or more source nodes, of the plurality of source nodes, that includes the particular source node;
  translate the group of one or more source nodes to generate a group of one or more target nodes; and
  for each target node of the group of one or more target nodes:
    identify a corresponding target node, of the subset of target nodes and the plurality of target nodes,
    determine whether the target node matches the corresponding target node, and
    replace the corresponding target node with the target node based on determining that the target node does not match the corresponding target node.

16. A system, comprising:
  one or more memories; and
  one or more processors to:
    identify a set of source nodes of a plurality of source nodes of a first graph associated with a source intent policy model,
      wherein the source intent policy model is associated with cloud services for one or more network devices;
    translate the set of source nodes to generate a set of target nodes,
      wherein the one or more processors, when translating the set of source nodes, are to:
        recursively traverse the set of source nodes to generate the set of target nodes,
          wherein each source node of the set of source nodes corresponds to at least one target node of the set of target nodes;
    identify a subset of target nodes, of the set of target nodes, that are not included in a plurality of target nodes of a second graph associated with a target intent policy model,
      wherein the target intent policy model is associated with on-device services of a network device of the one or more network devices;
    identify and resolve:
      one or more conflicts between the subset of target nodes and the plurality of target nodes; or
      one or more redundancies between the subset of target nodes and the plurality of target nodes,
    cause, based on a hierarchical order associated with the subset of target nodes and the plurality of target nodes and based on identifying and resolving the one or more conflicts or the one or more redundancies, the target intent policy model to be updated.

17. The system of claim 16, wherein the one or more processors, to identify the set of nodes, are to:
  identify a first group of source nodes of the plurality of source nodes;
  identify a second group of source nodes, of the plurality of source nodes, that depend from the first group of source nodes; and
  identify the set of source nodes as comprising the first group of source nodes and the second group of source nodes.

18. The system of claim 16, wherein the one or more processors are further to:
  identify, after causing the target intent policy model to be updated, a change to a particular source node of the plurality of source nodes;
  identify a group of one or more source nodes, of the plurality of source nodes, that includes the particular source node;
  translate the group of one or more source nodes to generate a group of one or more target nodes; and
  for each target node of the group of one or more target nodes:
    identify a corresponding target node of the subset of target nodes and the plurality of target nodes,
    determine whether the target node matches the corresponding target node, and
    replace the corresponding target node with the target node based on determining that the target node does not match the corresponding target node.

19. The non-transitory computer-readable medium of claim 11, wherein the one or more instructions, that cause the system to identify the subset of target nodes that are not included in the target intent policy model, cause the system to: for each target node of the set of target nodes:
  process the target node to determine a hash value;
  determine whether one of the plurality of target nodes is associated with the hash value; and
  identify the subset of target nodes as comprising the target node based on determining that one of the plurality of target nodes is not associated with the hash value.

20. The system of claim 16, wherein the one or more processors, to identify and resolve one or more redundancies between the subset of target nodes and the plurality of target nodes, are to:
- identify that a target node, of the subset of target nodes and the plurality of target nodes, is redundant with another target node, of the subset of target nodes and the plurality of target nodes; and
- remove the target node from the subset of target nodes and the plurality of target nodes.

* * * * *